(12) United States Patent
Doll et al.

(10) Patent No.: US 12,515,943 B2
(45) Date of Patent: *Jan. 6, 2026

(54) FOUNDRY-COMPATIBLE THROUGH SILICON VIA PROCESS FOR INTEGRATED MICRO-SPEAKER AND MICROPHONE

(71) Applicant: Vibrant Microsystems Inc., Cupertino, CA (US)

(72) Inventors: Joseph Doll, Bend, OR (US); Sanjay Bhandari, Cupertino, CA (US)

(73) Assignee: Vibrant Microsystems Inc., Cupertino, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 18/451,504

(22) Filed: Aug. 17, 2023

(65) Prior Publication Data

US 2025/0059023 A1 Feb. 20, 2025

(51) Int. Cl.
| | | |
|---|---|---|
| *H04R 19/04* | (2006.01) | |
| *B81B 7/00* | (2006.01) | |
| *B81C 1/00* | (2006.01) | |
| *H04R 3/00* | (2006.01) | |
| *H04R 7/04* | (2006.01) | |
| *H04R 19/02* | (2006.01) | |
| *H04R 31/00* | (2006.01) | |

(52) U.S. Cl.
CPC ........ *B81B 7/0006* (2013.01); *B81C 1/00095* (2013.01); *H04R 3/00* (2013.01); *H04R 7/04* (2013.01); *H04R 19/02* (2013.01); *H04R 19/04* (2013.01); *H04R 31/003* (2013.01); *H04R 31/006* (2013.01); *B81B 2201/0257* (2013.01); *B81B 2203/0127* (2013.01); *B81B 2203/04* (2013.01); *B81B 2207/015* (2013.01); *B81B 2207/07* (2013.01); *B81C 2201/0132* (2013.01); *B81C 2203/0728* (2013.01); *H04R 2201/003* (2013.01)

(58) Field of Classification Search
CPC .......... H04R 3/00; H04R 7/04; H04R 31/003; H04R 19/04; H04R 19/02; H04R 31/006; H04R 2201/003; B81B 2203/0127; B81B 2203/04; B81B 2207/015; B81C 2203/0728
USPC .................. 381/111–117, 347–348, 369, 190
See application file for complete search history.

*Primary Examiner* — George C Monikang
(74) *Attorney, Agent, or Firm* — Ogawa P.C.

(57) ABSTRACT

A MEMS audio device includes a first wafer having a top with a first cavity and a bottom with a vent hole coupled to the first cavity, wherein the bottom having first contacts, a second wafer disposed upon the first wafer having a flexible material layer disposed above the first cavity, a third wafer disposed upon the second wafer having physical contacts coupled to the second wafer, wherein the third wafer includes a second cavity disposed above the flexible material layer, a wiring wafer disposed below the first wafer having a second vent hole coupled to the first cavity, wherein the wiring wafer having second contacts coupled to the first contacts, and wherein the flexible material layer forms a diaphragm for the MEMS audio device.

21 Claims, 6 Drawing Sheets

FOUNDRY-COMPATIBLE THROUGH SILICON VIA PROCESS FOR INTEGRATED MICRO-SPEAKER AND MICROPHONE

BACKGROUND OF INVENTION

The present invention is directed to micro electro-mechanical systems, commonly termed "MEMS." In particular, the present invention provides a semiconductor foundry-compatible process to fabricate devices such as a MEMS speaker device and a MEMS microphone device, separately or on a common substrate. Although the invention has been described in terms of specific examples, it will be recognized that the invention has a much broader range of applicability.

Loudspeakers, also referred to as speaker drivers or speakers, are electro-acoustic transducers that convert electric signals to the movement of air. Speakers are an essential part of many consumer gadgets such as home music systems, smart watches or wearables, smartphones, laptops, tablets, earbuds, among others. As the thicknesses of mobile devices decrease, speakers have also become smaller in size. Currently, loud speakers refer to a speaker with greater than 4-inch diameter, mini speakers refer to a speaker with a 2-4 inch diameter, and micro speakers refer to speakers with a diameter less than 2-inches. Recently with the popularity of ear buds, the size of the speakers has decreased to less than 1-inch diameter.

Most conventional speakers are still designed with conventional technologies that include a thin moving diaphragm of paper, plastic, or similar material, and spring element which is actuated by electromagnetic signals that are proportional to an audio signal input to the speaker. Conventional speakers typically use a permanent magnet to generate a magnetic field in which a moving coil (driven with electrical signals) generates transient electromagnetic forces. Conventional speakers are incompatible with conventional surface mount printed circuit board (PCB) technology which is a disadvantage in the manufacturing flow for original equipment manufacturers (OEM) of electronic systems. Additionally, conventional speaker technology creates additional constraints on the placement of speakers inside smartphones, as an example, as magnets may adversely affect other components in the smartphone such as magnetic sensors and the like. These and other limitations prevent conventional speakers and related technologies from being used in many consumer devices.

In contrast to speakers, microphones have typically been built using different technologies. In some cases, microphones have utilized condenser/capacitance technology, electret condenser technology, MEMS technology among others. As such, the inventors of the present invention believe the integration of microphones and speakers in a monolithic device has not been considered or developed.

In light of the above, what is desired are semiconductor fabrication-compatible methods for manufacturing microphones, speakers, and integrated devices, and devices themselves.

SUMMARY OF INVENTION

The present invention is directed to micro electro-mechanical systems, commonly termed "MEMS." In particular, the present invention provides foundry compatible processes to fabricate a MEMS speaker device, a MEMS microphone, or combined devices and related devices and methods. Although the invention has been described in terms of specific examples, it will be recognized that the invention has a much broader range of applicability.

In an example, the present invention provides a foundry compatible process for fabricating a micro-speaker and a microphone device. The device typically has a cap device comprising a plurality of vent regions for propagating acoustic signals. The cap device can be made of a suitable material such as silicon, or other rigid substrate capable of being processed using semiconductor techniques. In an example, the device has a CMOS (i.e., Complementary metal-oxide-semiconductor) device coupled to the cap device. In an example, the CMOS device comprises at least one vent region (although there may be more) configured to allow backpressure to flow therethrough. The CMOS device can be a CMOS semiconductor substrate, including a plurality of CMOS cells. The device has a cavity region configured between an interior surface of the cap device and a CMOS device interior surface of the CMOS device. The device has a frame device coupled between the cap device and the CMOS device to form an exterior housing for the cavity region. An example, the frame device can be configured on either or both of the cap device and/or the CMOS device or integral with either or both devices.

In an example, the device has a movable diaphragm device comprising a thickness of silicon material having a thickness 0.1 nm to ten microns, and configured spatially in an elongated manner within the cavity region. In an example, the movable diaphragm device has a first surface and a second surface opposite of the first surface. In an example, the movable diaphragm is connected with at least two cantilever or springs. Each of the cantilever or springs being coupled between a peripheral region of the movable diagram device and a portion of a frame configured surrounding the movable diaphragm device.

In an example, the device has a CMOS electrode device configured on the CMOS device interior region. That is, the CMOS device has an electrode device or devices formed on an interior region of the CMOS device. In some embodiments, the CMOS device includes circuitry for the speaker and/or microphone.

In an example, cavities intended for housing the micro speaker and the microphone are etched in the handle wafer, also referred to as the cap wafer, using Deep Reactive Ion Etching (DRIE) process. In an example, the cavity etched handle wafer is bonded to the device wafer forming the diaphragms for the micro speaker and the microphone, with a fusion bonding of the two wafers.

In an example, the surface of the device wafer is grinded down to obtain the desired thickness of the device diaphragm for the micro-speaker and microphone. In an example, the thinning of the device layer is achieved using Chemical Mechanical Planarization (CMP) or Polishing. Alternatively, the device diaphragm can be deposited with the desired thickness as polysilicon using Low Pressure Chemical Vapor Deposition (LPCVD), or the like.

In an example, the top surface and oxide of the processed CMOS wafer is passivated with Nitride to protect the processed layers from a later dry etching step of Vapor Hydrogen Fluoride (VHF). In an example, vent holes are etched with DRIE in the CMOS wafer in the areas identified for speaker and microphone from the top (CMOS surface with metal layers) or the back, CMOS surface opposite of the metal surface.

In an example, the wafer stack of the device wafer & handle wafer is bonded to the CMOS wafer with an Aluminum Germanium (AlGe) bond.

In an example, vent holes are etched with DRIE process in the handle or cap wafer in the areas of microphone & speaker. These vent holes allow the speaker & microphone to pass the sound waves from the device to the external environment.

In an example, the diaphragm for speaker and microphone defined by the pattern on the device wafer are released using Vapor Hydro Fluoric (VHF) exposure from the vent holes.

In an example, the device has an electrical connection to the cap or the handle layer of the wafer through the polysilicon or the silicon connected via the AlGe bond to the CMOS wafer. In an example, the device layer or the MEMS diaphragms for the micro speaker and the microphone are driven from the connection of the polysilicon or the sacrificial silicon via the AlGe bond to the CMOS layer.

In an example, the cavity for the micro speaker is etched such that the speaker diaphragm moves between the cap surface and the cavity of the handle wafer. In an example, the cavity for the microphone is etched such that the microphone diaphragm move in the by the cavity on the handle wafer and the cavity on the cap surface.

According to some aspects, a method for forming a Micro-Electric Mechanical System (MEMS) audio device is disclosed. One technique may include receiving a first wafer characterized by an upper portion and a lower portion, wherein a first cavity is formed within the upper portion of the first wafer, disposing a second wafer upon the first wafer, wherein the second wafer comprises a semiconductor material having a first side and a second side, wherein the semiconductor material comprises a first portion of the semiconductor material, wherein a first material layer is formed upon the first side, wherein a first region of the first material layer is disposed below the first portion of the semiconductor material, and wherein the first material layer is disposed against the upper portion of the first wafer, and forming a second material layer upon the second side of the second wafer, wherein a first region of the second material layer is disposed above the first portion of the semiconductor material. A process may include forming a first plurality of contacts through the upper portion and within the first wafer, etching the lower portion of the first wafer to expose the first plurality of contacts, and forming a first plurality of vent holes through the lower portion of the first wafer, wherein a first vent hole from the first plurality of vent holes is coupled to the first cavity. A method may include receiving a third wafer having a plurality of metal layers disposed therein, wherein a second plurality of vent holes are formed through the third wafer, and wherein a second plurality of contacts are formed on an upper surface of the third wafer, coupling the first plurality of contacts to the second plurality of contacts, and etching at least the first region of the first material layer and the first region of the second material layer from around the first portion of the semiconductor material. In some embodiments, a first portion of the semiconductor material forms a diaphragm for the MEMS audio device that is configured to move within the first cavity.

According to another aspect, a Micro-Electric Mechanical System (MEMS) audio device is described. One device may include a first wafer characterized by a first surface comprising a first cavity and a second surface comprising at least a first vent hole formed through the first wafer and coupled to the first cavity, wherein the second surface comprises a first plurality of electrical contacts, and a second wafer disposed upon the first surface of the first wafer, wherein the second wafer is characterized by a flexible material layer, wherein a portion of the flexible material layer is disposed above the first cavity of the first wafer. An apparatus may include a third wafer disposed upon the second wafer, wherein the third wafer is characterized by a first surface having a first plurality of physical contacts coupled to the second wafer, wherein the third wafer is characterized by a first cavity, and wherein the first cavity of the third wafer is disposed above the portion of the flexible material layer, and a wiring wafer disposed below the second surface of the first wafer, wherein wiring wafer comprises at least a first vent hole, wherein the first vent hole of the wiring wafer is coupled to the first cavity of the first wafer, wherein the wiring wafer comprises a first plurality of electrical contacts, and wherein the first plurality of electrical contacts of the wiring wafer are coupled to the first plurality of electrical contacts of the first wafer. In some embodiments, a first portion of the flexible material forms a diaphragm for the MEMS audio device.

According to another aspect, a method of fabricating a Micro-Electric Mechanical System (MEMS) speaker device using a foundry compatible process is disclosed. A process may include providing a semiconductor substrate comprising a plurality of CMOS cells, a first surface and a second surface opposing the second surface, the CMOS cells comprising a drive circuit, and the semiconductor substrate configured with one or more electrodes formed on the first surface of the semiconductor substrate and the one or more electrodes being configured with the drive circuit for supplying a voltage potential to the one or more electrodes, and bonding the first surface of the semiconductor substrate to a MEMS semiconductor substrate device, the MEMS semiconductor substrate device comprising a MEMS speaker device configured from a diaphragm device coupled to a frame configured within the semiconductor substrate such the one or more electrodes from the semiconductor substrate are operably coupled to the diaphragm device to generate an audio signal upon actuating of the diaphragm device using the voltage potential generated from the drive circuit.

According to another aspect, a vertically integrated Micro-Electro Mechanical Systems (MEMS) assembly is described. One device may include a MEMS wafer or a combination of wafers, comprising a substrate having a first cavity and a MEMS layer, wherein the MEMS layer comprises a frame, a micro speaker diaphragm, and a flexible element, wherein the substrate is coupled to the frame, wherein the micro speaker diaphragm is coupled to the frame via the flexible element, wherein the flexible element enables the micro speaker diaphragm to move out of a plane of the MEMS layer within the cavity, and wherein the substrate comprises at least one electrode associated with the micro speaker diaphragm. An apparatus may include a wafer disposed above the MEMS wafer and coupled to the frame, wherein the wafer comprises another cavity, wherein the other cavity is disposed above the micro speaker diaphragm. An assembly may include a CMOS wafer disposed below the MEMS wafer and coupled to the frame, wherein the CMOS wafer comprises at least one active element, wherein the one active element is coupled to the one electrode, and wherein the one active element is configured to provide an electric signal to the one electrode, wherein the micro speaker diaphragm is configured to move out of the plane of the MEMS layer in response to the electrical signal.

Depending upon the example, the present invention can achieve one or more of these benefits and/or advantages. Various embodiments provides a foundry compatible process to fabricate a MEMS Micro-speaker that can reduce the size and profile height of the speaker without affecting the performance. Various embodiments can also integrate MEMS Microphone together with the MEMS speaker in the same integrated circuit. In an example, various embodiments can integrate the CMOS audio processing within a monolithic element together with MEMS, thereby miniaturizing the whole audio chain for demanding components such as ear buds, hearables, smartwatches and smart phones. In an example, various embodiments can be implemented using conventional semiconductor and MEMS process technologies for wide scale commercialization. These and other benefits and/or advantages are achievable with the present device and related methods. Further details of these benefits and/or advantages can be found throughout the present specification and more particularly below.

BRIEF DESCRIPTION OF FIGURES

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

According to various embodiments, techniques directed to fabrication of an integrated micro-speaker and microphone using Micro Electro Mechanical Systems "MEMS" are provided. In particular, some embodiments of the present invention disclose a Foundry compatible process for fabricating a MEMS speaker device and/or a MEMS microphone device. The terminology micro-speaker and speaker has been interchangeably used with both implying a device that can generate sound wave. Although the invention has been described in terms of specific examples, it will be recognized that the invention has a much broader range of applicability.

Figure 1:
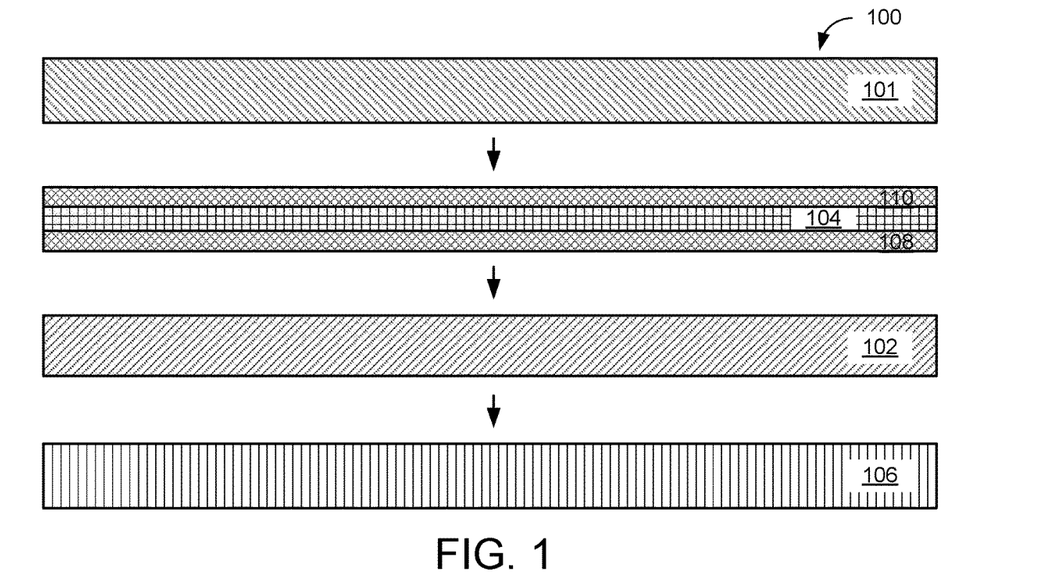
FIG. 1 is a simplified diagram of some embodiments.

FIG. 1 is a simplified diagram showing a set of wafers that are used in the fabrication of the process described in some embodiments. A device 100 typically includes a MEMS handle wafer 102, a device wafer 104 (with oxide layers 108 and 110), a lid wafer 101, and a substrate (e.g. CMOS) wafer 106. In some embodiments, material layers 108 and/or 110 may be an oxide, such as silicon oxide, a nitride, such as silicon nitride, or other material that may be etched (e.g. vapor etched), as disclosed below. In some embodiments, wafers 101, 102, 104 and 106 are silicon-based wafers/media. In other embodiments, wafer 104 may be semiconductor, polysilicon, carbide, graphene, or the like. For sake of convenience, reference to oxide layers 108 and 110 and semiconductor material wafer 101, 102, 106, and 108, are used, below.

In some embodiments, lid wafer 101, MEMS wafer 102, device wafer 104 and CMOS wafer 106 may be processed together or asynchronously from each other. In an example illustrated in FIGS. 2A-M, lid wafer 101, MEMS wafer 102 and device wafer 104 may be processed, combined, and further processed. The combination may then be bonded with substrate wafer 106, and then further processed.

Figure 2A:
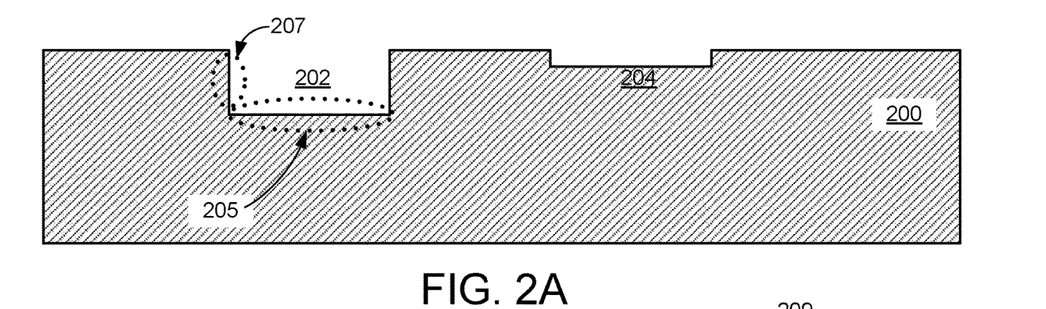
FIGS. 2A-M illustrates results of process steps according to some embodiments of the present invention.

FIGS. 2A-M illustrate results of various foundry-compatible processing steps of embodiments of the present invention. FIG. 2A illustrates a MEMS handle wafer 200, with cavities 202 and 204 that are intended for housing a micro speaker and a microphone. In various embodiments, cavities 202 and 204 are etched from MEMS wafer 200 typically using two separate masks and two Deep Reactive Ion Etching (DRIE) processes which may result in cavities 202 and 204 being different depths. In some embodiments, the planar dimension of the cavity and the depth of a cavity for a microphone may be different than for a speaker. As an example, the cavity depth for the microphone may be less than one micron to few tens of microns which may be shallower than the cavity depth for a speaker. The area for the cavity etch is defined using a photolithography process using a mask associated with this step. In some embodiments, if two or more micro-speakers are to be formed within wafer 200, then one mask and one DRIE processes may only be needed to accomplish this step.

In some embodiments, a series of grooves, bumps, ridges or other type of geometric structure may be etched or otherwise formed on the sidewalls and/or bottoms of cavities 202 (e.g. 205 and 207) and/or 204. These geometric structures may be used to inhibit stiction of a movable diaphragm (discussed below), disposed within cavities 202 and/or 204, against the sidewalls (e.g. 205) or bottoms (e.g. 207) of respective cavities 200 and/or 204.

Figure 2B:
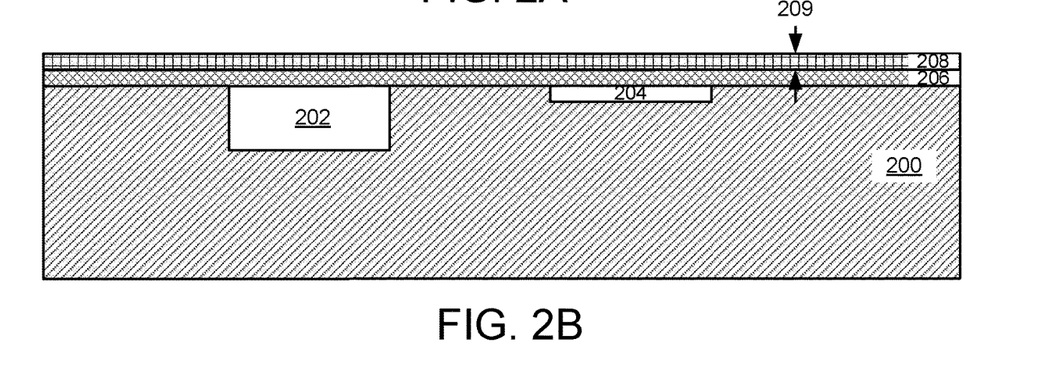

FIG. 2B illustrates a result of subsequent processes. In these processes, a device wafer (e.g. device wafer 104 typically having oxide layers 108 and 110, a silicon on insulator (SOI)), is bonded to wafer 200. In some cases, a fusion bonding process may be used. In this example, oxide layer 108 appears as oxide layer 206, and a portion of device layer 104 appears as layer 208. After the wafer bonding, oxide layer 110 and device layer 104 are grinded down to obtain the desired thickness 209 for a diaphragm layer 208, e.g. the silicon of the SOI is thinned down. This process step can be accomplished, for example, using Chemical Mechanical Planarization (CMP), polishing, or the like. In various embodiments, portions of diaphragm layer 208 are used as a diaphragm for a micro-speaker, a microphone, or the like. In various embodiments, an initial thickness of the device wafer 104 may be a few hundred microns, and a thickness 209 of diaphragm layer 208 can range from fractions of micrometers to a few micrometers. Alternatively, the device diaphragm layer can be deposited with the desired thickness as polysilicon using Low Pressure Chemical Vapor Deposition (LPCVD), or the like on top of oxide layer 206, rather than being thinned from an existing thick layer of silicon (e.g. SOI).

Figure 2C:
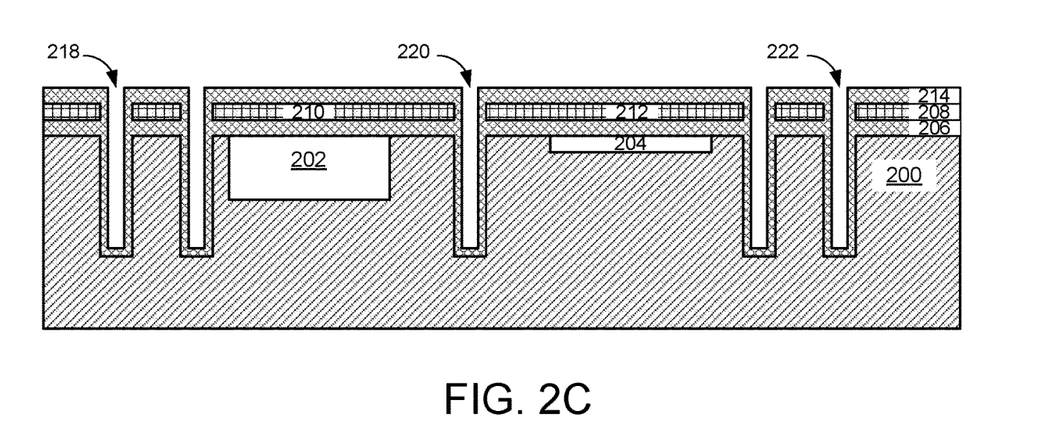

FIG. 2C illustrates a result of subsequent processes. In various embodiments, photoresist layers (not shown) may also be deposited and patterned upon layer 208 and then one or more etching processes (e.g. a deep reactive ion etching (DRIE) process) can be performed to define various trenches, e.g. 218, 220, 222, etc. These trenches will allow electrical contact between wafer 200 and other wafers or devices below wafer 200. In some embodiments, multiple etches, such as oxide RIE and silicon RIE may be used for trench regions 218, 220, 222, or the like.

In some embodiments, subsequent to forming the trench regions, an oxide may be disposed or formed upon the resultant structure. In the example in FIG. 2C, a thermal oxidation is performed over the resultant structure (e.g. upon diaphragm layer 208 and within the trenches 218, 220, 222, etc. within wafer 200) to form an oxide layer 214. As is illustrated, with thermal oxidation, oxide layer 214 may form uniformly on the walls within the trenches.

Figure 2D:
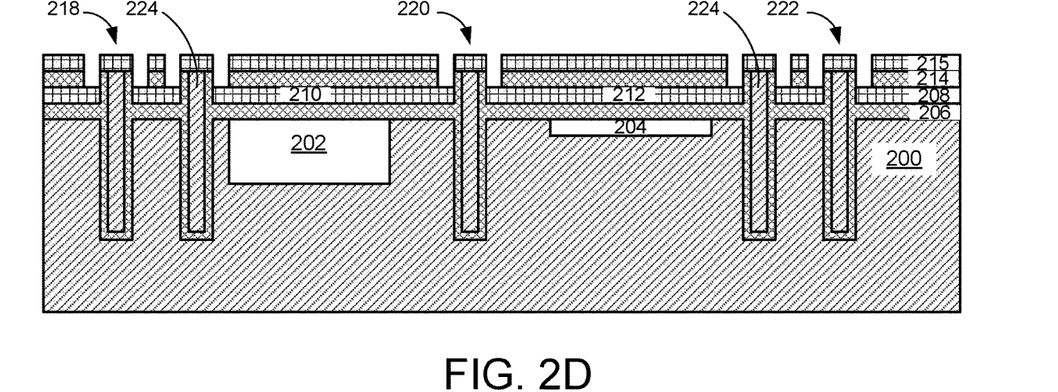

FIG. 2D illustrates a result of subsequent process steps. In various embodiments, a conductive material layer 224 is then deposited on top of the device wafer of FIG. 2C, and fills trench regions 218, 220, 222, etc. In some instances, the conductive material layer 224 may be conductive polysilicon or other conductive material. Material layer 224 may be formed in a number of ways, such as deposited in a high temperature epitaxial reactor (epi-poly) or deposited at lower temperature with the process of Low Pressure Chemical Vapor Deposition (LPCVD), or the like. In various embodiments, a CMP step may optionally then be applied to polish the surface of the silicon material layer 224 down to oxide layer 214. In some embodiments, a blanket silicon RIE may be used to etch down to oxide layer 214.

In various embodiments, a series of photolithographic masks, e.g. mask layer 215, may be used to selectively etch oxide layer 214, as shown, to facilitate the formation of contacts to material layer 224.

Figure 2E:
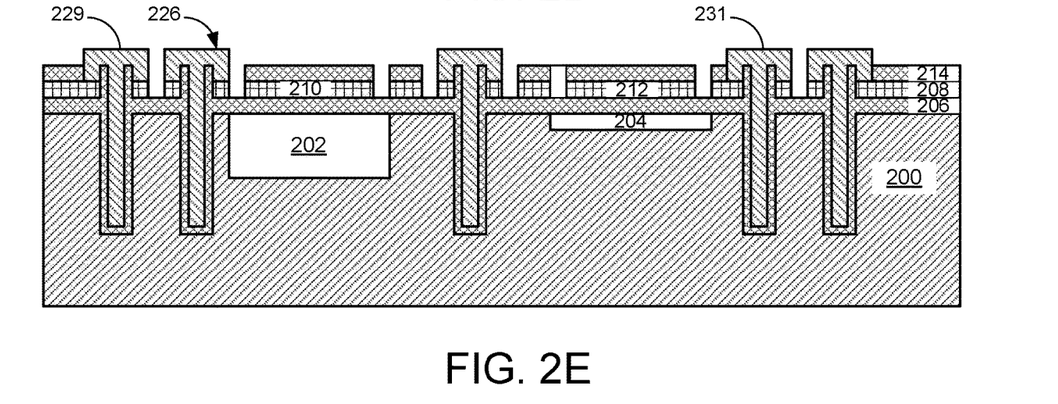

FIG. 2E illustrates a result of subsequent process steps. In various embodiments, after removal of mask layer 215, a conductive material layer 226 may be formed on top of oxide layer 214 and patterned by any conventional process, e.g. photoresist, plasma, etc. In some embodiments, a silicon RIE process is used to selectively remove conductive material 226 from oxide layer 214, thereby. As shown, a number of T-shaped cap structures, e.g. 229, 231, etc. are then formed.

Subsequently another photoresist layer (not shown) may be deposited upon the top surface (e.g. conductive material 226 and oxide layer 214) of this wafer and then patterned. Two or more etching processes may be performed to first etch through material layer 214 and then etch through material layer 208. In various embodiments, the photo lithographical steps performed upon diaphragm layer 208 defines what will become the speaker diaphragm 210, the microphone diaphragm 212, and other mechanical elements (e.g. springs that couple diaphragms 210 and 212 to wafer 200, and the like).

Figure 2F:
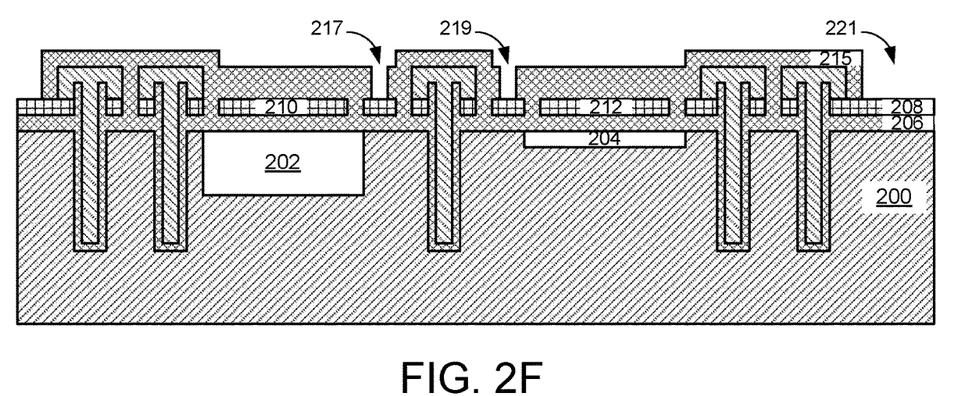

FIG. 2F illustrates a result after conventional processing steps. In various embodiments, a silicon dioxide (or similarly insulative material) layer 215 may be deposited on the device in FIG. 2E. Layer 215 passivates the top and the side walls of structures on the device and protects them from subsequent processing steps. Next another photoresist layer (not shown) may be deposited on top of layer 215 and patterned. Subsequently an etch (e.g. oxide etch, oxide RIE, etc.) may be performed to define physical contact regions, e.g. 217, 219, 221, etc.

Figure 2G:
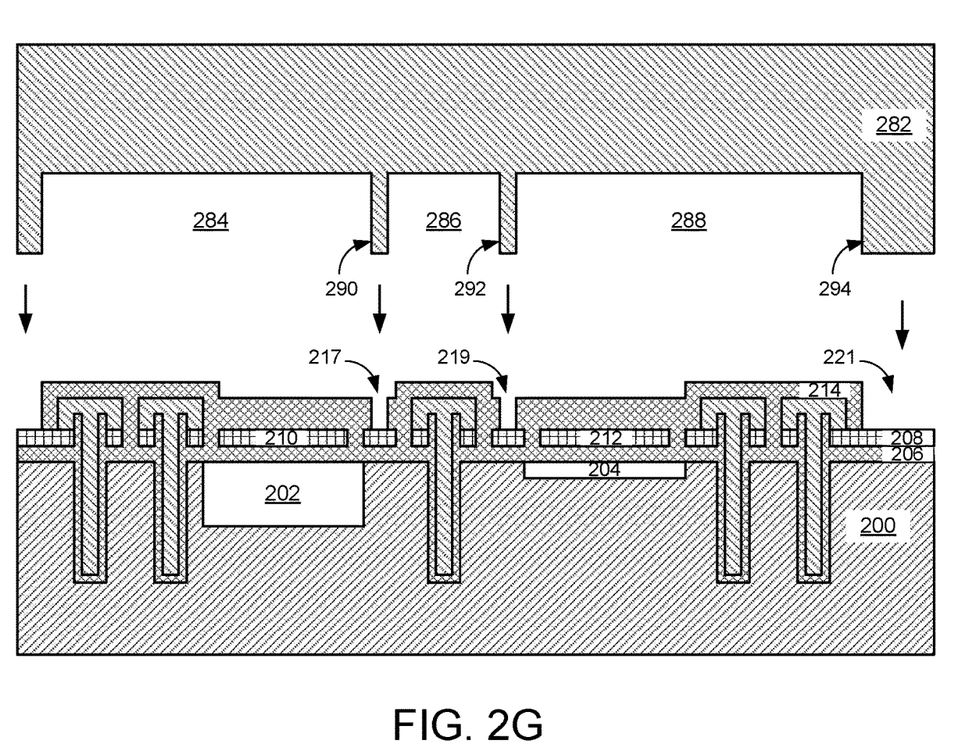

FIG. 2G illustrates a result of subsequent process steps. In various embodiments, a lid wafer 282 is provided. A photoresist layer (not shown) is deposited on lid wafer 282 and patterned. Subsequently a deep reactive ion etch (DRIE) or other etch process may be used to create cavities e.g. 284, 286, 288 within lid wafer 282. Next, in some embodiments, lid wafer 282 is flipped or inverted relative to wafer 200. Further, portions of lid wafer, e.g. 290, 292, 294, are then disposed upon wafer 200 at physical contact regions, e.g. 217, 219, 221, etc. Various methods for securing wafer 200 to lid wafer 282 are contemplated, such as fusion bonding.

Figure 2H:
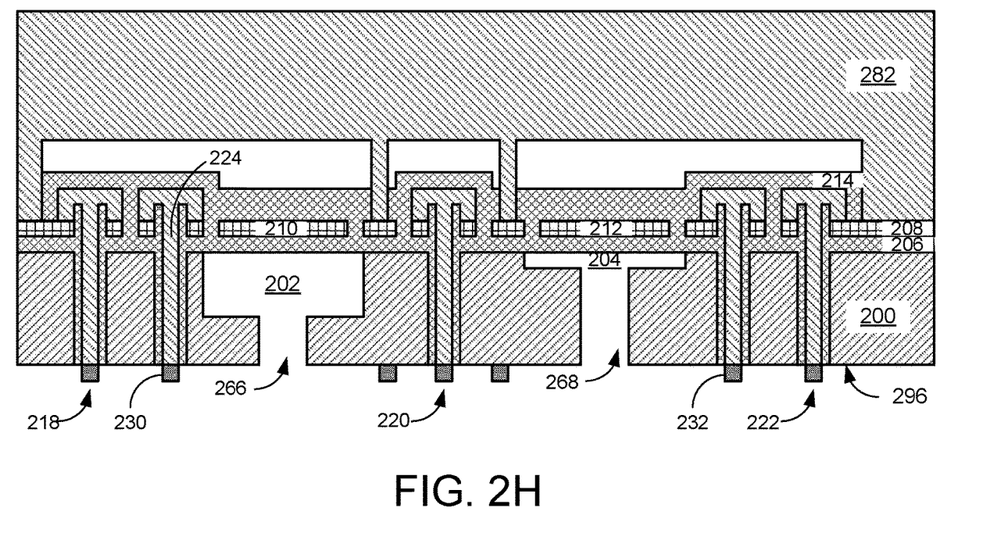

FIG. 2H illustrates a result of processing steps. In various embodiments, the bottom of wafer 200 is first thinned, typically until the conductive material 224 of trench regions, e.g. 218, 220, 222, etc. are exposed. In various embodiments, a conductive material layer, such as Germanium or similar material is then sputtered on the bottom 296 of wafer 200. In some examples, Germanium is used for enabling bonding such as Eutectic bonding using, for example, Aluminum-Germanium (AlGe) bond, as will be seen in subsequent steps. In other embodiments, other types of bonding are contemplated, such as fusion bonding, and the like. The Germanium material is then patterned on top of exposed conductive material 224 to form a first set of contacts, e.g. 230, 232.

In various embodiments, multiple openings (e.g. vent holes 266 and 268) may be etched through MEMS wafer 200 using an RIE, DRIE process, or the like. In this example, vent hole 266 is typically disposed below cavity 202 and micro speaker diaphragm 210; and vent hole 268 is typically disposed below cavity 204. These vent holes respectively allows air pressure to pass outwards or to inwards from the external environment from or to diaphragms 210, 212, or the like.

Figure 2I:
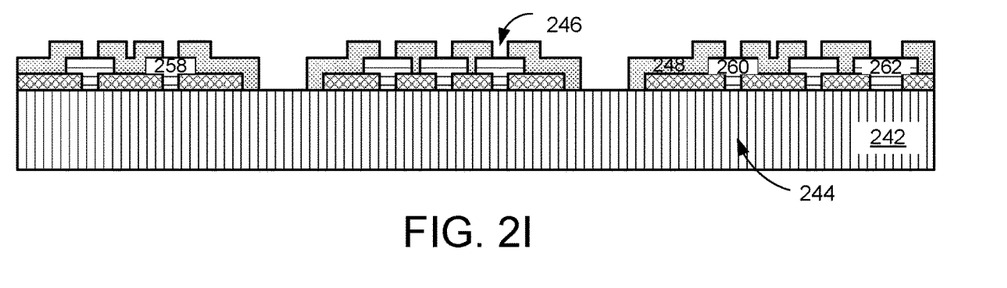

FIG. 2I illustrates a result of various processing steps. Specifically, FIG. 2I illustrates a substrate wafer 242, comprising a semiconductor wafer including one or more metal layers, e.g. 246. Conventional processes may be used for the deposition, patterning, and etching of the conductive metal material (e.g. aluminum, copper, etc.), the formation of intermetal dielectric layers, the formation of vias, and the like upon a semiconductor wafer. In various embodiments, the conductive material 246 may be used to form internal interconnects as well as a second set of contacts, e.g. 258, 260, 262. In some embodiments, the top surface of the wafer 242 may be passivated with Nitride material layer 248 (e.g. SixNy). Layer 248 is typically used to protect metal layers 246, as well to protect wafer 242 from subsequent Vapor Hydrogen Fluoride (VHF) etches described below.

As shown, in various embodiments, pads 258, 260, 262 and the like are exposed through material layer 248. These contact pads (e.g. 258, 260) are locations where wafer 242 may be electrically coupled to MEMS wafer 200, and contact pads (e.g. 262) may be locations where wafer 242 will support external wire bonds. In various embodiments, contact pads may be aluminum or other contact material. In the case of aluminum contact pads, the aluminum material may form a eutectic bonds with the germanium material portion of first set of contacts, e.g. 230, 232 of device wafer 200.

In some examples, wafer 242 is a CMOS wafer and includes active devices therein, The active devices 244 (e.g. transistors, etc.) may implement circuitry for wafer 200 including microphone and/or micro speaker driving circuitry, reading circuitry, processing circuitry, an amplifier circuitry, an encoder circuitry, a decoder circuitry, a signal processor circuitry, a digital signal processor circuitry, and the like.

Figure 2J:
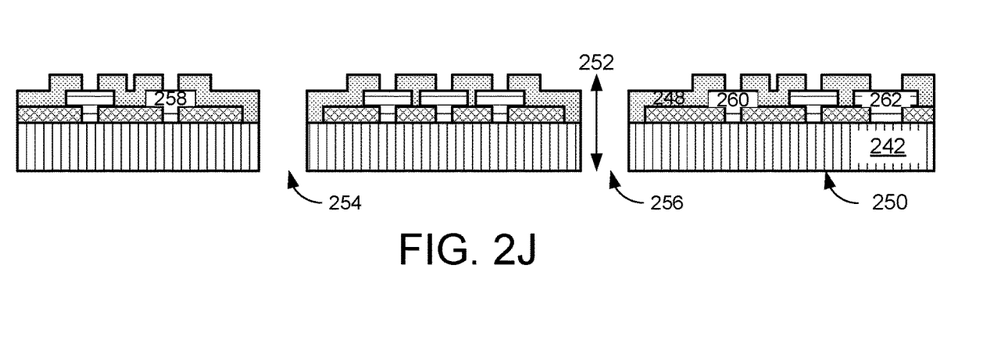

FIG. 2J illustrates a result of subsequent processing steps. In various embodiments, a backside 250 of wafer 242, a surface opposite to the metal layers, may be polished with CMP and/or grinded down to until a desired thickness 252 of wafer 242 is achieved. Additionally, in some embodiments, vent holes 254 and 256 are etched with RIE, DRIE, or the like in wafer 242. Locations for vent holes 254 and 256 are typically aligned to where vent holes 266 and 268 are located on wafer 200 for the speaker (e.g. diaphragm 210) and microphone (e.g. diaphragm 212). In some embodiments, vent holes 254 and 256 may be etched from the top side or backside 250 of wafer 242.

Figure 2K:
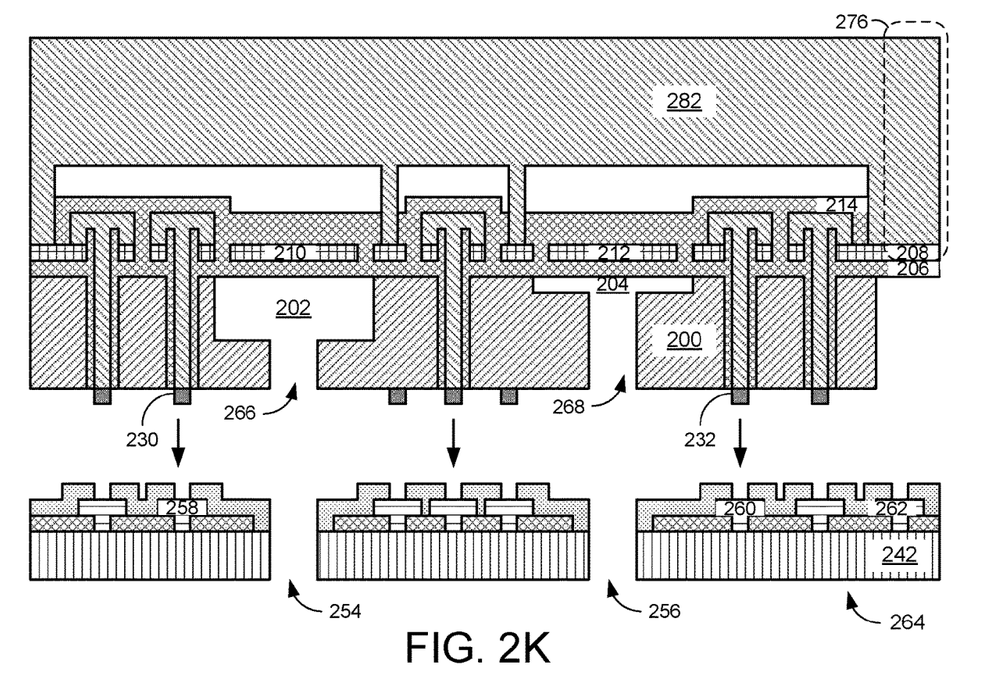

FIG. 2K illustrates a wafer bonding process. In various embodiments, device wafer 200 (e.g. the wafer stack of combined wafer 200 with lid wafer 282 illustrated in FIG. 2H) is disposed on wiring wafer 242. As can be seen in this embodiment, cavity 202, micro speaker diaphragm 210 and vent hole 266 may be vertically disposed above vent hole 254, and cavity 204, microphone diaphragm 212, vent hole 268 may be vertically disposed above vent hole 256. In some embodiments, vent holes need not be centered below the respective cavities or even have the same cross-sectional shape. In other embodiments, additional multiple micro speakers, multiple microphones, or the like may be disposed within a combined wafer 264.

As can be seen in this embodiment, when the wafers are combined, the germanium material of contact 230 will be disposed upon aluminum contact pad 258, the germanium material of contact 232 will be disposed upon contact pad 260, and the like. In some examples, to form a eutectic bond between these respective contacts, wafers 200 and 242 are typically pressed against each other and heated to approximately 400 degrees C., although different conditions may be used in other examples. Additionally, different bonding techniques may be used, such as fusion bonding.

Figure 2L:
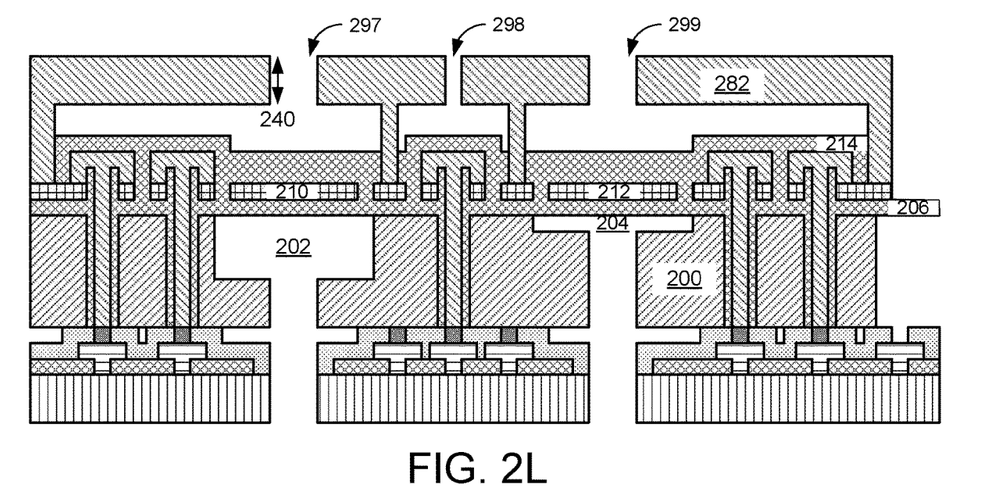

FIG. 2L illustrates a result of subsequent processing steps. In various embodiments, a topside 250 of wafer 282 (on wafer 200), may be polished with CMP and/or grinded down to until a desired thickness 240 is achieved. In addition, vent holes 297, 298 and 299 may be etched with RIE, DRIE, or the like in wafer 282. Locations for vent holes 297 and 299 are typically aligned to where vent holes 266 and 268 are located on wafer 200 for the speaker (e.g. diaphragm 210) and microphone (e.g. diaphragm 212). In various embodiments illustrated in FIG. 2M, the multiple holes, e.g. 297 and 299 and channels, e.g. 298, enable Vapor Hydro Fluoric (VHF) material to enter between wafer 282 and wafer 200.

Figure 2M:
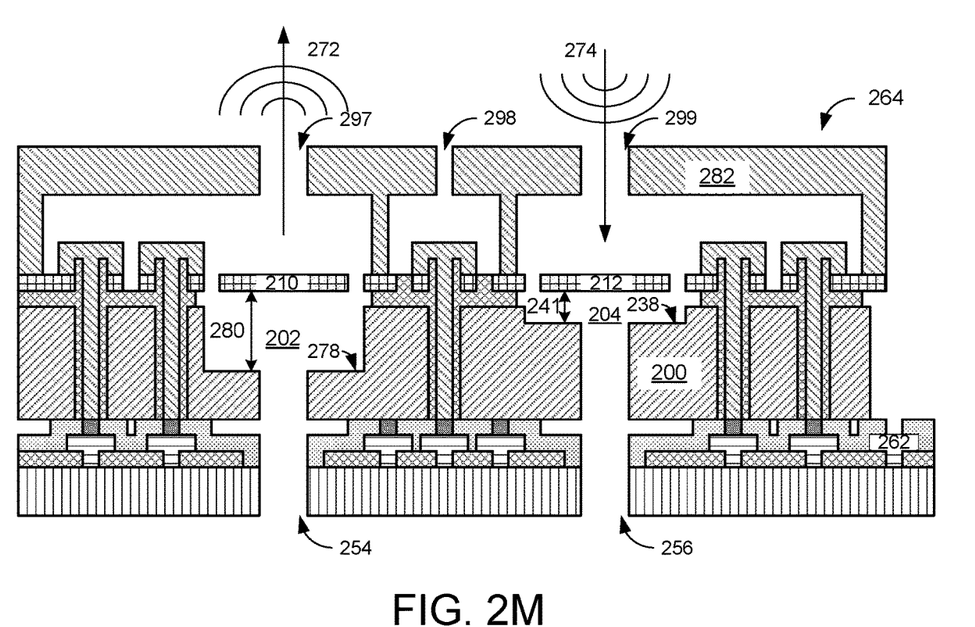

FIG. 2M illustrates a result of subsequent processing steps. In various embodiments, combined wafer 264 may then be processed with a Vapor Hydro Fluoric (VHF) etch. As mentioned above, the multiple openings (e.g. 297, 298, 299, 254, 256, etc.) are configured to allow VHF to be channeled between lid wafer 208 and wafer 200. In operation, the VHF is used to etch away portions of oxide layers 206. In particular, portions of oxide layers 206 and 214 surrounding micro speaker diaphragm 210 and associated spring elements are etched away. Further, portions of oxide layer 206 and 214 surrounding microphone diaphragm 212 and associated spring elements are etched away, and the like. As a result of the above processes, micro speaker diaphragm 210 is suspended and can be directed to move within cavity 202 to generate sound pressure, and microphone diaphragm 212 is suspended and can move relative to a backplate 238 (on wafer 200) to sense sound pressure. As can be seen in FIG. 2M, a distance between diaphragm 212 and backplate (electrode) 238 is height 241. Further, a distance between diaphragm 210 and backplate (electrode) 278 is height 280. In some embodiments, height 241 may be within a range of 0.1 to 5 microns, 0.3 to 3 microns, 0.5 to 1 microns, or the like; height 280 may be within a range of 4 to 20 microns, 5 to 10 microns, 3 to 7 microns, or the like.

In various examples, vent holes, e.g. 297, 299, etc. respectively allow soundwaves to pass outwards 272 from the micro speaker diaphragm 210 to the external environment and allows soundwaves to pass inwards 274 from the external environment to the microphone diaphragm 212.

Figure 3:
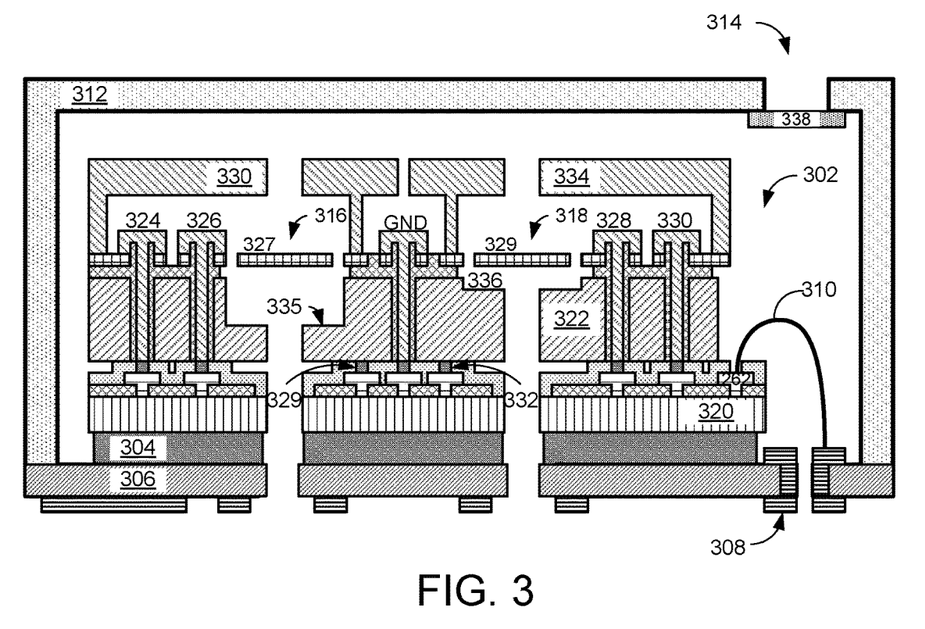
FIG. 3 shows cross section of a packaged embodiment.

FIG. 3 illustrates an embodiment of a completed device. In this example, beginning with the embodiment illustrated in FIG. 2M multiple completed devices are formed on a wafer. At this stage in the process, product-level wafer testing and sorting of devices can be performed by applying signals and receiving data from external test systems via the exposed CMOS bond pads, e.g. 262. Next, the wafer is then mounted on a dicing tape, or the like and diced using stealth dicing, or the like. Singulated device dies, e.g. die 302 are then available for assembly as shown in FIG. 3.

In various embodiments, die 302 is then coupled via an interposer material 304 (e.g. epoxy, resin) to a printed circuit board (e.g. PCB) 306. In various embodiments, a metal housing 312 may be coupled to PCB 306 to provide electrical contacts and isolation of combined wafer 302, and the like. As shown, metal housing 312 typically includes one or more opening 314 where sound pressure from micro speaker 316 can exit metal housing 312 and where sound pressure from external sources can reach microphone 318. In some cases, opening 314 may include a mesh-like material 338 that reduces humidity, dust, dirt or other contaminants from entering metal housing 312.

In various embodiments, PCB 306 may include a number of metallic contacts or terminals, e.g. 308. In various embodiments, the metallic contacts may be electrically coupled to circuitry within wafer 320 and/or to portions of wafer portion 322 of combined wafer 302. In one example, wire bonds, e.g. 310 are coupled to contact pads, e.g. 262, and the like.

In some embodiments, micro speaker 316 may be driven by three different signals: speaker_top, speaker_dia, and speaker_bottom, which may be provided from external sources or internally provided. In this example, wafer 320 provides speaker_top 324 and speaker_dia 326 to wafer 322. As shown, speaker_top 324 is coupled to the top portion 330 of microspeaker 316 cavity. Further, speaker_dia 326 may be coupled to the diaphragm 327 of microspeaker via the above-mention spring/suspension structures. Additionally, speaker_bottom 329 may be coupled to the bottom portion (e.g. backplate 335) of microspeaker cavity 316. In exemplary operation, the audio signals on speaker_top and speaker_bottom are out of phase (opposite phase) and speaker_dia, may be held constant. As an example, speaker_top may vary in time: 20V, 40V, 0V, 20V, while speaker_bottom may vary in time: 20V, 0V, 40V, 20V, and speaker_dia may be held at ground. In other embodiments, the bias voltages and amplitudes of speaker_top, speaker_bot, and speaker_dia may vary. In one example, the differential signals of speaker_top and speaker_bot causes speaker diaphragm 327 to move out-of plane (e.g. upwards and downwards within microspeaker 316 cavity), thus producing sound.

In some embodiments, microphone 318 may be driven/sensed by three different signals: mic_top, mic_dia, and mic_bottom, which may be driven/sensed from external sources or internal sources. In this example, wafer 320 provides mic_top 328, mic_dia 330, and mic_bottom 332 to wafer 322. As shown, mic_top 328 is coupled to the top portion 334 of microphone 318 cavity. Further, mic_dia 330 may be coupled to the diaphragm 329 of microphone 318 via the above-mentioned spring/suspension structures. Additionally, mic_bottom 332 may be coupled to the backplate 336. In operation, a DC bias voltage may be applied to mic_bottom and/or mic_dia, and when microphone diaphragm 329 moves out-of-plane movement (e.g. upwards and downwards) in response to a received sound, a change of capacitance across mic_dia 330 and mic_bottom 332 is sensed.

Further embodiments can be envisioned to one of ordinary skill in the art after reading this disclosure. In some embodiments, the wafer identified as wafer 242 may simply be a wafer with metallic interconnects similar to wafer 242 shown above, but include or lack active devices, e.g. transistors, and the like. Bonding of contacts between MEMS handle wafer 200 and wafer 242 may still be performed in some cases. In various embodiments MEMS handle wafer 200 may not be disposed upon a CMOS wafer 242. In some embodiments, MEMS handle wafer 200 and a CMOS wafer may be placed or mounted proximate to each other upon a common substrate, e.g. PCB 306, under a common metal housing, e.g. 312 in FIG. 3. Contacts, between a wafer portion and CMOS wafer, may then be facilitated via wire bonding, or the like, similar to wire bond 310.

In other embodiments, multiple MEMS speakers or MEMS microphones may be formed upon a common MEMS handle wafer 200, using the processes disclosed above. In some embodiments, one MEMS speaker may be optimized for one band of audio output (e.g. midrange), one MEMS speaker may be optimized for another band of audio output (e.g. bass), and the like. In some cases, frequency band directed/cross-over functionality may be implemented by active and/or passive devices formed within a CMOS wafer, within MEMS handle wafer 200, or via external devices, e.g. discrete passive capacitors, inductors, resistors, and the like disposed upon PCB 306, for example. Additionally, in still other embodiments, one or more MEMS microphones and one or more MEMS speakers may be formed monolithically as was illustrated in the figures above.

The block diagrams of the architecture and flow charts are grouped for ease of understanding. However, it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A method for forming a Micro-Electric Mechanical System (MEMS) audio device comprising:
    receiving a first wafer characterized by an upper portion and a lower portion, wherein a first cavity is formed within the upper portion of the first wafer;
    disposing a second wafer upon the first wafer, wherein the second wafer comprises a semiconductor material having a first side and a second side, wherein the semiconductor material comprises a first portion of the semiconductor material, wherein a first material layer is formed upon the first side, wherein a first region of the first material layer is disposed below the first portion of the semiconductor material, and wherein the first material layer is disposed against the upper portion of the first wafer;
    forming a second material layer upon the second side of the second wafer, wherein a first region of the second material layer is disposed above the first portion of the semiconductor material;
    forming a first plurality of contacts through the upper portion and within the first wafer;
    etching the lower portion of the first wafer to expose the first plurality of contacts;
    forming a first plurality of vent holes through the lower portion of the first wafer, wherein a first vent hole from the first plurality of vent holes is coupled to the first cavity;
    receiving a third wafer having a plurality of metal layers disposed therein, wherein a second plurality of vent holes are formed through the third wafer, and wherein a second plurality of contacts are formed on an upper surface of the third wafer;
    coupling the first plurality of contacts to the second plurality of contacts;
    etching at least the first region of the first material layer and the first region of the second material layer from around the first portion of the semiconductor material; and
    wherein the first portion of the semiconductor material forms a diaphragm for the MEMS audio device that is configured to move within the first cavity.

2. The method of claim 1 wherein the third wafer comprises a CMOS device wafer having a plurality of active devices.

3. The method of claim 1 wherein the MEMS audio device is selected from a group consisting of: a speaker and a microphone.

4. The method of claim 1
    wherein the first portion of the semiconductor material forms a diaphragm for a speaker configured to move within the first cavity;
    wherein a second cavity is formed within the upper portion of the first wafer;
    wherein the semiconductor material comprises a second portion of the semiconductor material;
    wherein a second region of the first material layer is disposed above the second portion of the semiconductor material;
    wherein a second region of the second material layer is disposed below the second portion of the semiconductor material;
    wherein a second vent hole from the first plurality of vent holes is coupled to the second cavity;
    wherein the method further comprising: etching at least the second region of the first material layer and the second region of the second material layer from around the second portion of the semiconductor material; and
    wherein the second portion of the semiconductor material forms a diaphragm for a microphone configured to move within the second cavity.

5. The method of claim 1 wherein the forming the first plurality of contacts comprises:
    etching a trench through a second portion of the first material layer and a second portion of the second material layer into the upper portion of the first wafer;
    forming an insulating layer within the trench;
    disposing a conductive semiconductor material layer above the insulating layer within the trench.

6. The method of claim 1 wherein the method further comprises wafer bonding with Aluminum Germanium bond.

7. The method of claim 1 wherein the etching at least the first region of the first material layer and the first region of the second material layer from around the first portion of the semiconductor material comprises: providing vapor hydrofluoric acid into the first cavity.

8. The method of claim 1 further comprising: performing a deep reactive ion etching (DRIE) process to the third wafer to form the second plurality of vent holes.

9. The method of claim 1, where the semiconductor material comprises a polysilicon layer deposited in an epitaxial reactor or with Low Pressure Chemical Vapor Deposition (LPCVD).

10. A Micro-Electric Mechanical System (MEMS) audio device comprising:
    a first wafer characterized by a first surface comprising a first cavity and a second surface comprising at least a first vent hole formed through the first wafer and coupled to the first cavity, wherein the second surface comprises a first plurality of electrical contacts;
    a second wafer disposed upon the first surface of the first wafer, wherein the second wafer is characterized by a flexible material layer, wherein a portion of the flexible material layer is disposed above the first cavity of the first wafer;

a third wafer disposed upon the second wafer, wherein the third wafer is characterized by a first surface having a first plurality of physical contacts coupled to the second wafer, wherein the third wafer is characterized by a first cavity, and wherein the first cavity of the third wafer is disposed above the portion of the flexible material layer;

a wiring wafer disposed below the second surface of the first wafer, wherein wiring wafer comprises at least a first vent hole, wherein the first vent hole of the wiring wafer is coupled to the first cavity of the first wafer, wherein the wiring wafer comprises a first plurality of electrical contacts, and wherein the first plurality of electrical contacts of the wiring wafer are coupled to the first plurality of electrical contacts of the first wafer; and wherein the first portion of the flexible material forms a diaphragm for the MEMS audio device.

11. The device of claim 10 wherein the MEMS audio device is selected from a group consisting of: a speaker and a microphone.

12. The device of claim 10 wherein the wiring wafer comprises a CMOS wafer having a plurality of active devices.

13. The device of claim 10
wherein the first surface of the first wafer comprises a second cavity; and
wherein the second surface of the first wafer comprises a second vent hole formed through the first wafer and coupled to the second cavity;
wherein another portion of the flexible material layer is disposed above the second cavity of the first wafer;
wherein the wiring wafer comprises at least a second vent hole, wherein the second vent hole of the wiring wafer is coupled to the second cavity of the first wafer;
wherein the other portion of the second material forms a diaphragm for another MEMS audio device.

14. The device of claim 13 further comprising:
a first electrode associated with the diaphragm for the MEMS audio device, wherein a first distance is associated with a distance between the diaphragm for the MEMS audio device and the first electrode;
a second sense electrode associated with the diaphragm for the other MEMS audio device, wherein a second distance is associated with a distance between the diaphragm for the other MEMS device and the second electrode; and
wherein the first distance is larger than the second distance.

15. The device of claim 14
wherein the first distance is within a range of 4 to 40 microns; and
wherein the second distance is within a range of 0.1 to 5 micron.

16. The device of claim 10 further comprising a CMOS wafer coupled to the wiring wafer, wherein a CMOS device comprises an audio function selected from a group consisting of: an amplifier, an audio driver, an encoder, a decoder, a signal processor, a digital signal processor.

17. A method of fabricating a Micro-Electric Mechanical System (MEMS) speaker device using a foundry compatible process, the method comprising:
providing a semiconductor substrate comprising a plurality of CMOS cells, a first surface and a second surface opposing the second surface, the CMOS cells comprising a drive circuit, and the semiconductor substrate configured with one or more electrodes formed on the first surface of the semiconductor substrate and the one or more electrodes being configured with the drive circuit for supplying a voltage potential to the one or more electrodes; and
coupling the one or more electrodes formed on the first surface of the semiconductor substrate to a MEMS semiconductor substrate device, the MEMS semiconductor substrate device comprising a MEMS speaker device configured from a diaphragm device coupled to a frame, wherein the one or more electrodes from the semiconductor substrate are operably coupled to the diaphragm device to generate an audio signal upon actuating of the diaphragm device using the voltage potential generated from the drive circuit.

18. A vertically integrated Micro-Electro Mechanical Systems (MEMS) assembly comprising:
a MEMS wafer or a combination of wafers, comprising a substrate having a first cavity and a MEMS layer, wherein the MEMS layer comprises a frame, a micro speaker diaphragm, and a flexible element, wherein the substrate is coupled to the frame, wherein the micro speaker diaphragm is coupled to the frame via the flexible element, wherein the flexible element enables the micro speaker diaphragm to move out of a plane of the MEMS layer within the cavity, and wherein the substrate comprises at least one electrode associated with the micro speaker diaphragm;
a wafer disposed above the MEMS wafer and coupled to the frame, wherein the wafer comprises another cavity, wherein the other cavity is disposed above the micro speaker diaphragm;
a CMOS wafer disposed below the MEMS wafer and coupled to the frame, wherein the CMOS wafer comprises at least one active element, wherein the one active element is coupled to the one electrode, and wherein the one active element is configured to provide an electric signal to the one electrode;
wherein the micro speaker diaphragm is configured to move out of the plane of the MEMS layer in response to the electrical signal.

19. The assembly of claim 18, where there are one or more sensors integrated in the same system as the micro speaker.

20. The assembly of claim 18, where the MEMS diaphragm is electrostatically activated from both the top and the bottom direction.

21. The assembly of claim 18
wherein the MEMS wafer comprises a first plurality of contacts on a bottom surface of the substrate;
wherein the CMOS wafer comprises a second plurality of contacts on a top surface; and
wherein the first plurality of contacts are coupled to the second plurality of contacts.

* * * * *